US012759580B2

(12) United States Patent
Sights et al.

(10) Patent No.: US 12,759,580 B2
(45) Date of Patent: Oct. 13, 2026

(54) ACCURACY VERIFICATION OF A PERCEPTION SYSTEM OF A VEHICLE

(71) Applicant: Trimble Inc., Westminster, CO (US)

(72) Inventors: Brandon Sights, San Marcos, CA (US); Tom A. Sterling, Lakewood, CO (US); Michael F. Cash, Mountain View, CA (US)

(73) Assignee: Trimble Inc., Westminster, CO (US)

( * ) Notice: Subject to any disclaimer, the term of this patent is extended or adjusted under 35 U.S.C. 154(b) by 3 days.

(21) Appl. No.: 19/193,017

(22) Filed: Apr. 29, 2025

(65) Prior Publication Data

US 2025/0269872 A1 Aug. 28, 2025

Related U.S. Application Data

(62) Division of application No. 17/473,051, filed on Sep. 13, 2021, now Pat. No. 12,319,310.

(51) Int. Cl.
*B60W 60/00* (2020.01)
*G06V 20/58* (2022.01)

(52) U.S. Cl.
CPC ........... *B60W 60/001* (2020.02); *G06V 20/58* (2022.01); *B60W 2420/403* (2013.01); *B60W 2420/408* (2024.01); *B60W 2554/4048* (2020.02)

(58) Field of Classification Search
CPC ......... B60W 60/001; B60W 2420/403; B60W 2420/408; B60W 2554/4048; G06V 20/58; G06T 2207/10016; G06T 2207/30252; G06T 7/80
See application file for complete search history.

(56) References Cited

U.S. PATENT DOCUMENTS 11,199,614 B1 * 12/2021 Gan ........................ G01S 17/42
12,319,310 B2 6/2025 Sights et al.
2018/0307238 A1 * 10/2018 Wisniowski .......... B60W 30/00
(Continued)

OTHER PUBLICATIONS

U.S. Appl. No. 17/473,051, Non-Final Office Action, Mailed On Oct. 22, 2024, 12 pages.
(Continued)

*Primary Examiner* — Thomas Ingram
(74) *Attorney, Agent, or Firm* — Kilpatrick Townsend & Stockton LLP

(57) ABSTRACT

A method of verifying accuracy of a perception system of a vehicle includes causing the vehicle to traverse a path around a target that is fixed in an environment. The target has a known pose. The path is configured so that the target comes into a respective field of view (FOV) of each respective perception sensor of one or more perception sensors of the perception system along the path. The method further includes, for each respective perception sensor of the one or more perception sensors, while the target is within the respective FOV of the respective perception sensor, acquiring a respective image of the target using the respective perception sensor; at the perception system, determining a respective pose of the target based on the respective image; and at a computer system communicatively coupled with the perception system, determining whether the respective pose matches the known pose of the target.

19 Claims, 12 Drawing Sheets

(56) References Cited

U.S. PATENT DOCUMENTS

| | | | | |
|---|---|---|---|---|
| 2020/0406904 | A1* | 12/2020 | Yan | G07C 5/0841 |
| 2021/0146942 | A1* | 5/2021 | Hrabe | B25J 9/1692 |

OTHER PUBLICATIONS

U.S. Appl. No. 17/473,051, Restriction Requirement, Mailed On Aug. 29, 2024, 6 pages.
U.S. Appl. No. 17/473,051, Notice of Allowance, Mailed On Mar. 10, 2025, 8 pages.
Application No. EP22194897.9 , Extended European Search Report, Mailed On Feb. 10, 2023, 9 pages.

* cited by examiner

ACCURACY VERIFICATION OF A PERCEPTION SYSTEM OF A VEHICLE

CROSS-REFERENCES TO RELATED APPLICATIONS

The present application is a division of U.S. application Ser. No. 17/473,051, filed Sep. 13, 2021, the entire contents of which are incorporated herein by reference in its entirety for all purposes.

BACKGROUND

An autonomous or semi-autonomous vehicle can be equipped with a perception system for detecting objects in its environment. The perception system can include perception sensors, such as radars, LiDARs, cameras, and the like. The perception sensors can acquire three-dimensional images (e.g., point clouds) and/or two-dimensional images of the environment within their fields of view. For example, a point cloud representing the objects in the environment, such as other vehicles, pedestrians, street signs, and buildings, can be constructed based on the images acquired by the perception sensors. The point cloud can be used to assist the navigation of the autonomous vehicle so as to avoid collision with obstacles. For example, if a pedestrian is detected in front of the vehicle, the autonomous vehicle can apply its brake to cause the vehicle to slow down or stop.

Safe operation of an autonomous vehicle can rely on the accuracy of the perception system. The perception sensors can be initially installed on the autonomous vehicle at the desired locations with the desired orientations. The position and the orientation of each perception sensor can be calibrated with respect to the vehicle. Such calibration can be performed, for example, in a manufacturer's plant or when the perception system is installed. Accurate calibrations can ensure that the image or point cloud acquired by the perception system represents the objects relative to the vehicle accurately. However, during maintenance, storage, and transport, the perception sensors can become damaged or misaligned. For example, a minor crash (e.g., hitting a tree branch) can possibly cause a perception sensor to move from its previously calibrated position. Therefore, it can be important to verify the accuracy of the perception system before activating the perception system for navigating the autonomous vehicle.

SUMMARY

According to some embodiments, a method of verifying accuracy of a perception system of a vehicle includes causing the vehicle to traverse a path around a target that is fixed in an environment. The target has a known pose. The path is configured so that the target comes into a respective field of view (FOV) of each respective perception sensor of one or more perception sensors of the perception system along the path. The method further includes, for each respective perception sensor of the one or more perception sensors, while the target is within the respective FOV of the respective perception sensor, acquiring a respective image of the target using the respective perception sensor; at the perception system, determining a respective pose of the target based on the respective image; and at a computer system communicatively coupled with the perception system, determining whether the respective pose matches the known pose of the target.

According to some embodiments, a method of verifying accuracy of a perception system of a vehicle includes, for each respective perception sensor of one or more perception sensors of the perception system: moving a target to a respective location that is within a respective field of view (FOV) of the respective perception sensor; acquiring a respective image of the target using the respective perception sensor while the target is at the respective location; at the perception system, determining a respective pose of the target based on the respective image; determining a respective reference pose of the target while the target is at the respective location using a positioning solution attached to the target; and at a computer system communicatively coupled to the perception system and the positioning solution, determining whether the respective pose matches the respective reference pose.

DETAILED DESCRIPTION

Figure 1:
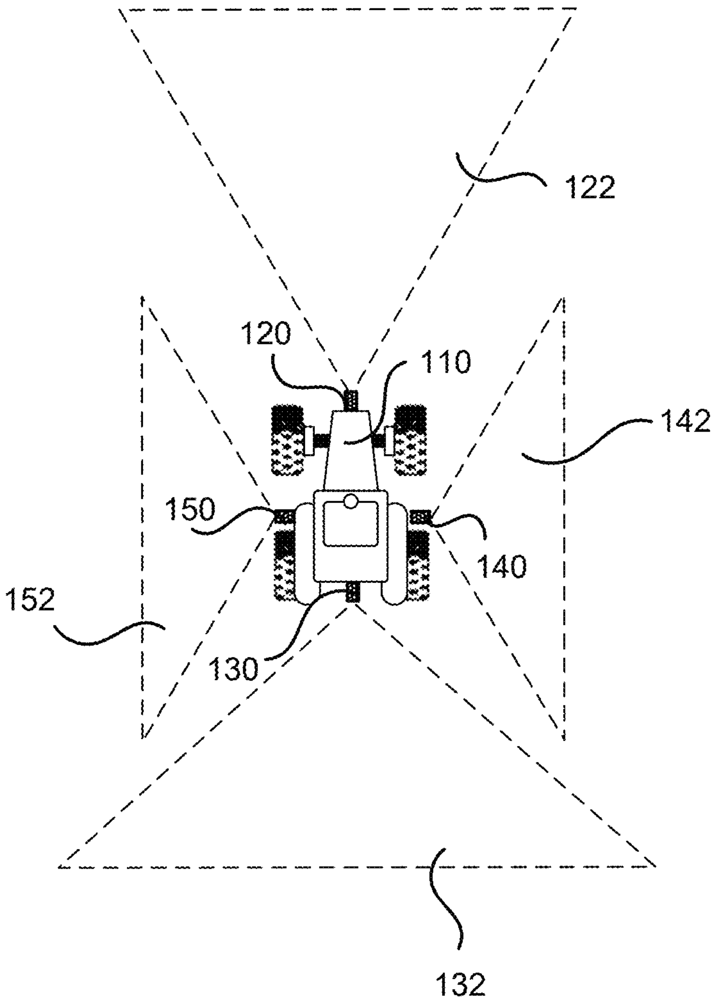
FIG. 1 illustrates a vehicle that is equipped with multiple perception sensors.

Embodiments of the present invention provide methods of verifying accuracy of a perception system of a vehicle. FIG. 1 illustrates a vehicle 110 that is equipped with multiple perception sensors. For example, a first perception sensor 120 can be mounted in the front of the vehicle 110 (e.g., on the front bumper or front windshield), so that its field of view (FOV) 122 is directed toward the front. A second perception sensor 130 can be mounted at the rear of the vehicle 110 (e.g., on the rear bumper or rear windshield), so that its FOV 132 is directed toward the rear. A third perception sensor 140 can be mounted on the right side of the vehicle 110, so that its FOV 142 is directed toward the right. A fourth perception sensor 150 can be mounted on the left side of the vehicle 110, so that its FOV 152 is directed toward the left. The vehicle 110 can include additional perception sensors. Some perception sensors can have overlapping FOVs. Also, some perception sensors can have a 360-degree FOV (e.g., a rotating LiDAR). The vehicle 110 can be an autonomous vehicle or a semi-autonomous vehicle (which can be referred to herein as an autonomous vehicle).

Each of the perception sensors 120, 130, 140, or 150 can comprise, for example, a radar, a LiDAR, a camera, or the like. Each of the perception sensors 120, 130, 140, or 150 can be configured to acquire three-dimensional or two-dimensional images of the environment within its respective FOV 122, 132, 142, or 152. Thus, the perception sensors 120, 130, 140, and 150 can form a perception system for the vehicle 110 that can detect objects in the environment surrounding the vehicle 110. The sensor data acquired by the perception sensors 120, 130, 140, and 150 can assist the autonomous navigation of the vehicle 110.

Each perception sensor 120, 130, 140, or 150 may acquire a raw image. The raw image may be referenced to the coordinate system of the perception sensor, which may need to be converted into the coordinate system of the vehicle. For example, a LiDAR sensor can acquire a raw point cloud referenced to its own coordinate system. A software algorithm can convert the raw point cloud into a point cloud referenced to the coordinate system of the vehicle, based on the calibrated position and orientation of the LiDAR sensor relative to the vehicle 110. Thus, if the LiDAR sensor has moved from its calibrated position, the resulting point cloud can represent objects' positions incorrectly.

According to some embodiments, methods are provided to verifying the accuracy of each perception sensor of a perception system of a vehicle. These methods can involve bringing a target with a known pose (including position and orientation) into the FOV of each perception sensor, and verify that each perception sensor detects the target at the correct pose. In some embodiments, the vehicle can traverse a predetermined path around a fixed target with a known pose, so that the fixed target comes into the FOV of each perception sensor for at least a portion of the path. The pose measured by each perception sensor can be compared to the known pose to determine whether each perception sensor is correctly aligned. In some other embodiments, a target equipped with a high accuracy position solution (e.g., a GNSS) can be moved around the vehicle into the FOV of each perception sensor. The pose measured by each perception sensor can be compared to the pose measured by the high accuracy position solution to determine whether each perception sensor is correctly aligned. Various embodiments are described in more detail below.

Figure 2A:
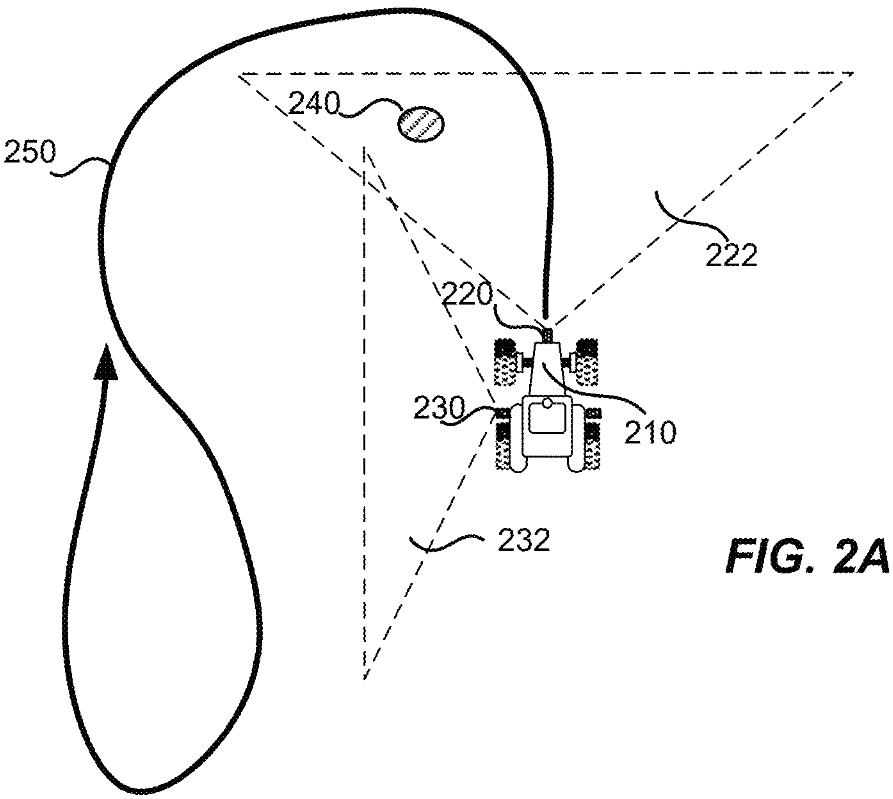
FIGS. 2A and 2B illustrate a method of verifying accuracy of a perception system of a vehicle according to some embodiments.
Figure 2B:
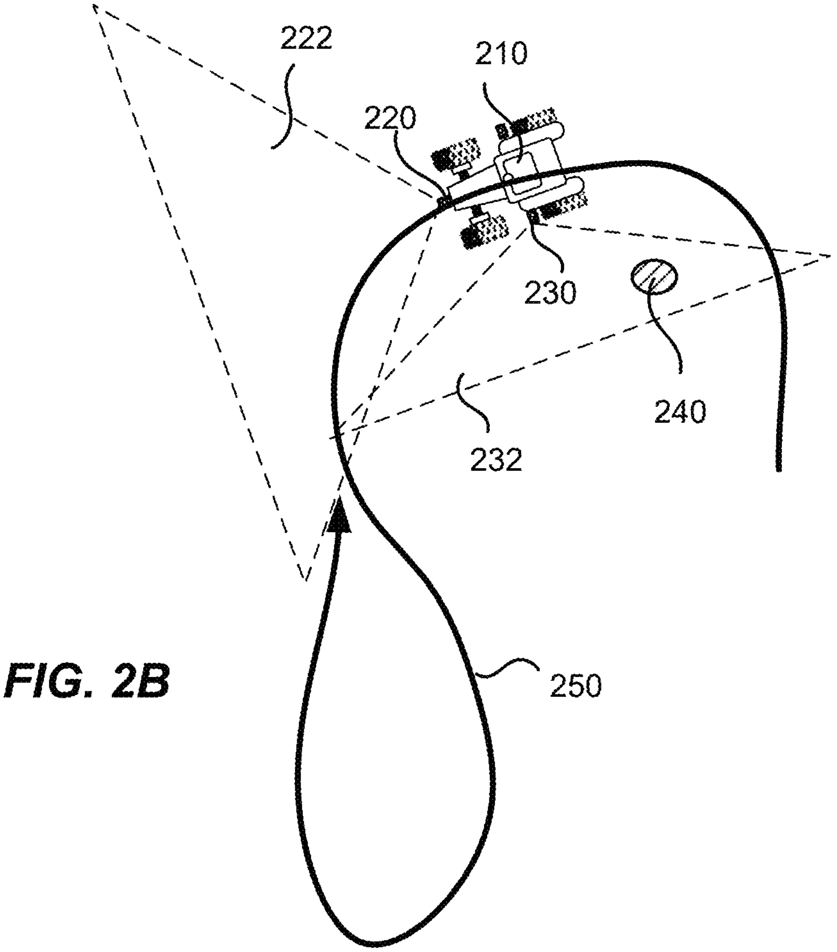

FIGS. 2A and 2B illustrate a method of verifying accuracy of a perception system of a vehicle 210 according to some embodiments. The perception system of the vehicle 210 includes multiple perception sensors mounted at various locations on the vehicle 210. For simplicity, only two perception sensors 220 and 230 are shown in FIGS. 2A and 2B. As illustrated, the two perception sensors 220 and 230 are mounted on the front and the left side of the vehicle 210, respectively. The vehicle 210 can include more than two perception sensors so that their combined FOV covers the entire surrounding of the vehicle 210.

As illustrated in FIGS. 2A and 2B, there is a target 240 that is fixed in the environment. The target 240 can, for example, include a tree, a street sign, or the like. The target 240 can be previously surveyed, so that its pose (including its position and orientation) can be accurately known. To verify the accuracies of the perception sensors 220 and 230, the vehicle can be driven along a predetermined path 250. The vehicle 210 can be driven by a human operator, or can be driven using an automated steering system (but under the supervision of a human operator, as the accuracy of the perception system has not yet been verified).

The path 250 can be designed so that all perception sensors would "see" the target at certain ranges and angles along the path 250. That is, the fixed target 240 would come into the FOV of each of the perception sensors (including the first perception sensor 220 and the second perception sensor 230, as well as other perception sensors not shown) along the path 250. For example, when the vehicle 210 is at a first position along the path 250 as illustrated in FIG. 2A, the fixed target 240 is within the FOV 222 of the first perception sensor 220; and when the vehicle 210 is at a second position along the path 250 as illustrated in FIG. 2B, the fixed target 240 is within the FOV 232 of the second perception sensor 230.

When the vehicle 210 is at the first position shown in FIG. 2A, the first perception sensor 220 can acquire a first image of the target 240, and determine a first pose the target 240 based on the first image. The first pose can be compared with the known pose of the target. If the first pose matches with the known pose within a threshold (for example 5%, or an absolute value), it can be determined that the first perception sensor 220 is correctly aligned. Similarly, when the vehicle 210 is at the second position shown in FIG. 2B, the second perception sensor 230 can acquire a second image of the target 240, and determine a second pose of the target 240 based on the second image. The second pose can be compared with the known pose. If the second pose matches with the known pose within the threshold, it can be determined that the second perception sensor 230 is correctly aligned.

It may be advantageous to design the path 250 so that the pose of the target 240 can be measured when the target 240 is in both the near field and the far field of each perception sensor. In some embodiments, each perception sensor can acquire a sequence of images (e.g., a sequence of video frames) of the target 240 when the target 240 is within its FOV. The movement of the target 240 with respect to the vehicle 210 can be determined from the sequence of images. The movement can then be compared with an expected movement (e.g., a previously recorded movement) to determine whether they match with each other. This would provide an additional verification of the accuracy of the perception sensors.

Figure 3:
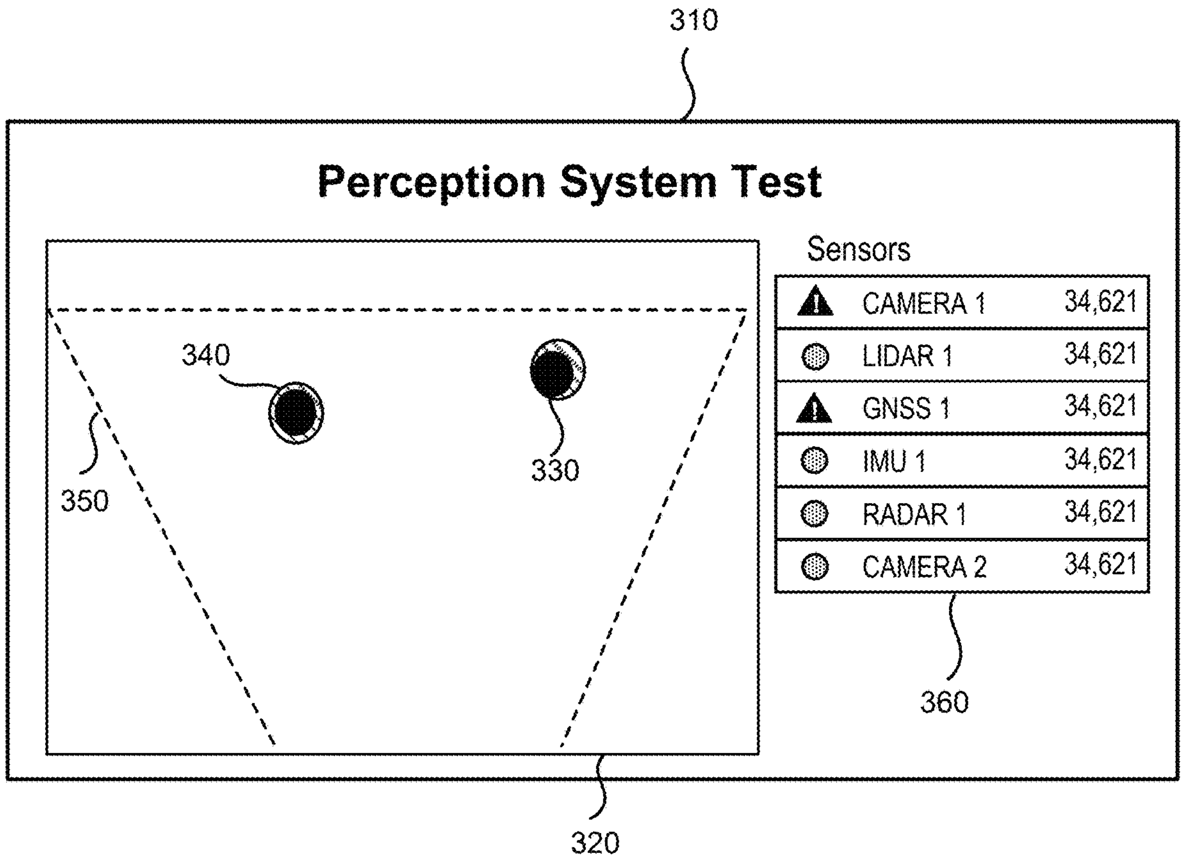
FIG. 3 shows an exemplary graphic user interface (GUI) of an application for verifying accuracy of a perception system of a vehicle according to some embodiments.

According to some embodiments, the process of verifying the accuracy of the perception system can be managed by an application running on an operator's device (e.g., a portable computer device or a computer device installed in the dashboard of the vehicle). FIG. 3 shows an exemplary graphic user interface (GUI) 310 of the application according to some embodiments. For example, in the display area 320, a first target 330 and a second target 340 are shown to be currently within a first FOV 350 of a first perception sensor (e.g., a LiDAR). The known positions of the first target 330 and the second target 340 (e.g., determined from previous surveys) are shown as shaded circles. The detected positions of the first target 330 and the second target 340 as measured by the first perception sensor are shown as the solid circles. If the detected positions of the first target 330 and the second target 340 match the known positions of the first target 330 and the second target 340, respectively, it can be determined that the first perception sensor passes the test.

In another display area 360, the status of various perception sensors can be shown. For example, a green circle can indicate that the perception sensor passes the test, and a red triangle can indicate that the perception sensor does not pass the test. Therefore, an operator can take necessary actions accordingly to correct the alignments of those perceptions sensors that do not pass the test. In some embodiments, when all the perception sensors pass the test, the perception system can be activated for navigation of the vehicle.

Figure 4:
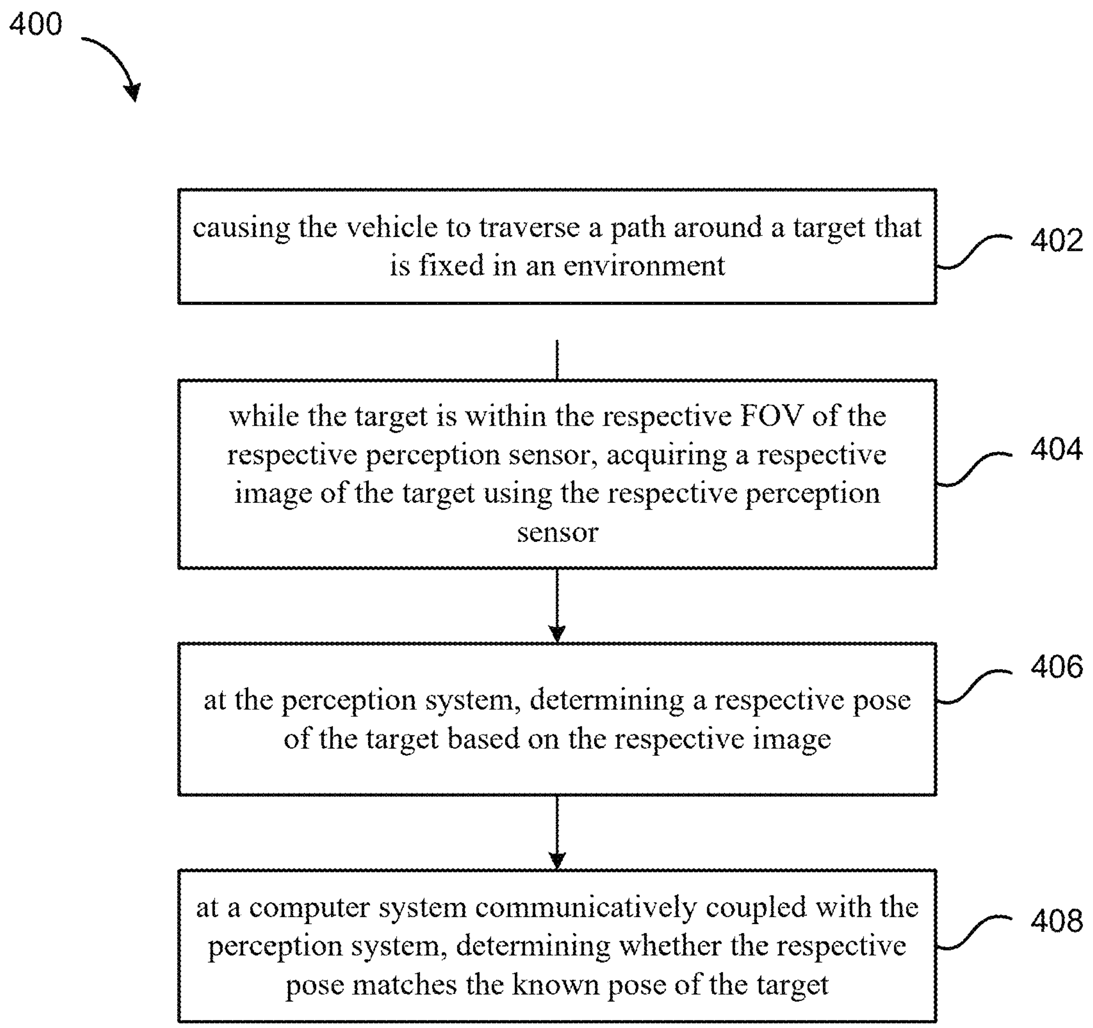
FIG. 4 shows a simplified flowchart illustrating a method of verifying accuracy of a perception system of a vehicle according to some embodiments.

FIG. 4 shows a simplified flowchart illustrating a method 400 of verifying accuracy of a perception system of a vehicle according to some embodiments. The perception system includes one or more perception sensors mounted on the vehicle.

The method 400 includes, at 402, causing the vehicle to traverse a path around a target that is fixed in an environment. The target has a known pose. The path is configured so that the target comes into a respective field of view (FOV) of each respective perception sensor of the one or more perception sensors along the path.

The method 400 further includes, at 404, for each respective perception sensor of the one or more perception sensors, while the target is within the respective FOV of the respective perception sensor, acquiring a respective image of the target using the respective perception sensor; at 406, at the perception system, determining a respective pose of the target based on the respective image; and at 408, at a computer system communicatively coupled with the perception system, determining whether the respective pose matches the known pose of the target.

According to some embodiments, the method 400 can further includes, at the computer system, upon determining that the respective pose matches the known pose of the target within a threshold, providing an indication to an operator that the respective perception sensor is correctly aligned.

According to some embodiments, the method 400 can further includes, at the computer system, upon determining that the respective pose deviates from the known pose of the target beyond a threshold, providing an indication to an operator that the respective perception sensor is not correctly aligned.

According to some embodiments, the method 400 can further includes, at the computer system, upon determining that, for each respective perception sensor of the one or more perception sensors, the respective pose matches the known pose of the target within a threshold, activating the perception system for navigation of the vehicle.

According to some embodiments, the method 400 can further includes, for each respective perception sensor of the one or more perception sensors: while the target is within the respective FOV of the respective perception sensor, acquiring a sequence of images of the target using the respective perception sensor; at the perception system, determining a movement of the target with respect to the vehicle based on the sequence of images; and at the computer system, determining whether the movement of the target matches with an expected movement.

It should be appreciated that the specific steps illustrated in FIG. 4 provide a particular method of verifying accuracy of a perception system of a vehicle according to some embodiments. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

In some embodiments, instead of driving the vehicle around a fixed target, a target can be moved around the vehicle so that it comes into the FOVs of various perception sensors. The target can be equipped with a high accuracy position solution (e.g., a GNSS) configured to measure the target's pose accurately. The pose measured by the high accuracy position solution can be used as a reference pose to verify that a perception sensor detects the target at the correct pose. The target can be carried by a person to various locations around the vehicle, or can be carried by another vehicle that is driven around the vehicle.

Figure 5:
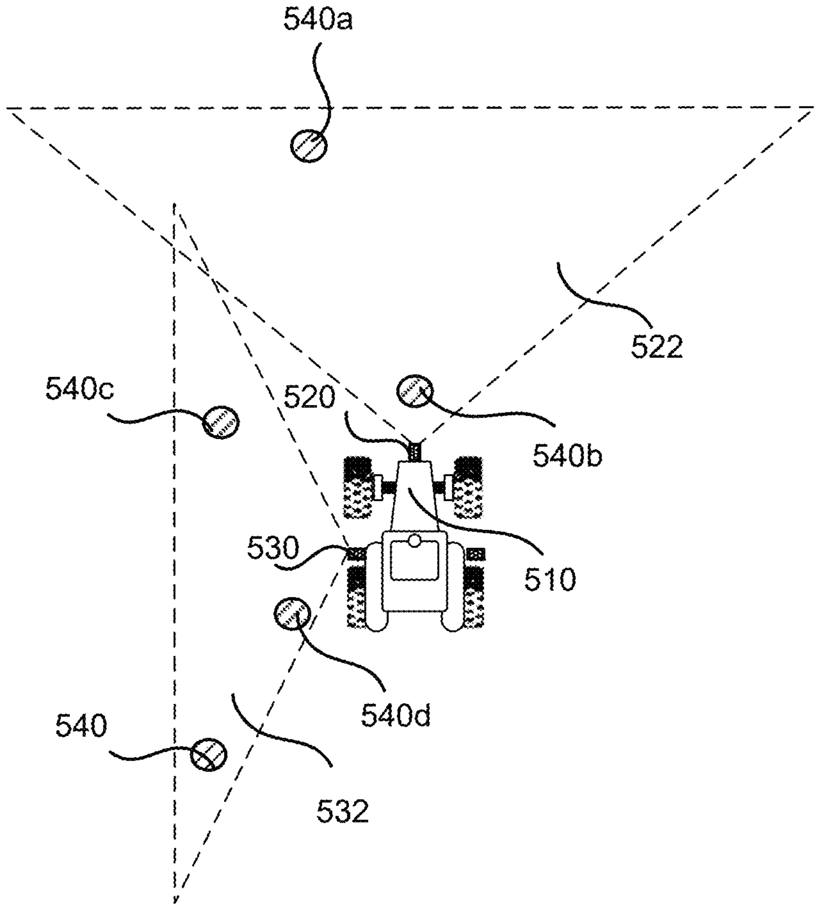
FIG. 5 illustrates a method of verifying accuracy of a perception system of a vehicle according to some embodiments.

FIG. 5 illustrates a method of verifying accuracy of a perception system of a vehicle 510 according to some embodiments. The perception system of the vehicle 510 can include a first perception sensor 520 mounted on the front of the vehicle 510, and a second perception sensor 530 mounted on the left side of the vehicle 510. For simplicity, only two perception sensors 520 and 530 are shown. It should be understood that the vehicle 510 can include additional perception sensors.

To verify the accuracy of each perception sensor of the perception system, a target 540 can be moved into the FOV of each of the perception sensors, while the vehicle 510 remains stationary. For example, the target 540 can be moved to a first location 540*a*, which is within the FOV 522 of the first perception sensor 520. The first perception sensor 520 can acquire a first image of the target 540 while the target 540 is at the first location 540*a*. A first pose of the target 540 can be determined based on the first image. Meanwhile, a position solution attached to the target 540 can measure a first reference pose of the target 540 at the first location 540*a*. If the first pose matches the first reference pose within a threshold, it can be determined that the first perception sensor 520 is correctly aligned. Similarly, the target 540 can be moved to a second location 540*c*, which is within the FOV 532 of the second perception sensor 530. A second pose of the target 540 can be measured based on a second image. Meanwhile, the position solution attached to the target 540 can measure a second reference pose of the target 540 at the second location 540*c*. The second pose can be compared to a second reference pose to determine whether the second perception sensor 530 is correctly aligned.

In some embodiments, it can be advantages to check the accuracy of each perception sensor with the target in both far field and near field. For example, referring to FIG. 5, in addition to the first location 540*a* that is in the far field of the first perception sensor 520, the accuracy of the first perception sensor 520 is also verified while the target 540 is moved to the third location 540*b*, which is in the near field of the first perception sensor 520. Similarly, in addition to the second location 540*c* that is in the far field of the second perception sensor 530, the accuracy of the second perception sensor 530 is also verified while the target 540 is moved to the fourth location 540*d*, which is in the near field of the second perception sensor 530. In some embodiments, an operator or another vehicle carrying the target 540 can traverse a path around the vehicle 510 designed to cover both the far field and the near field of each perception sensor of the perception system of the vehicle 510.

Figure 6:
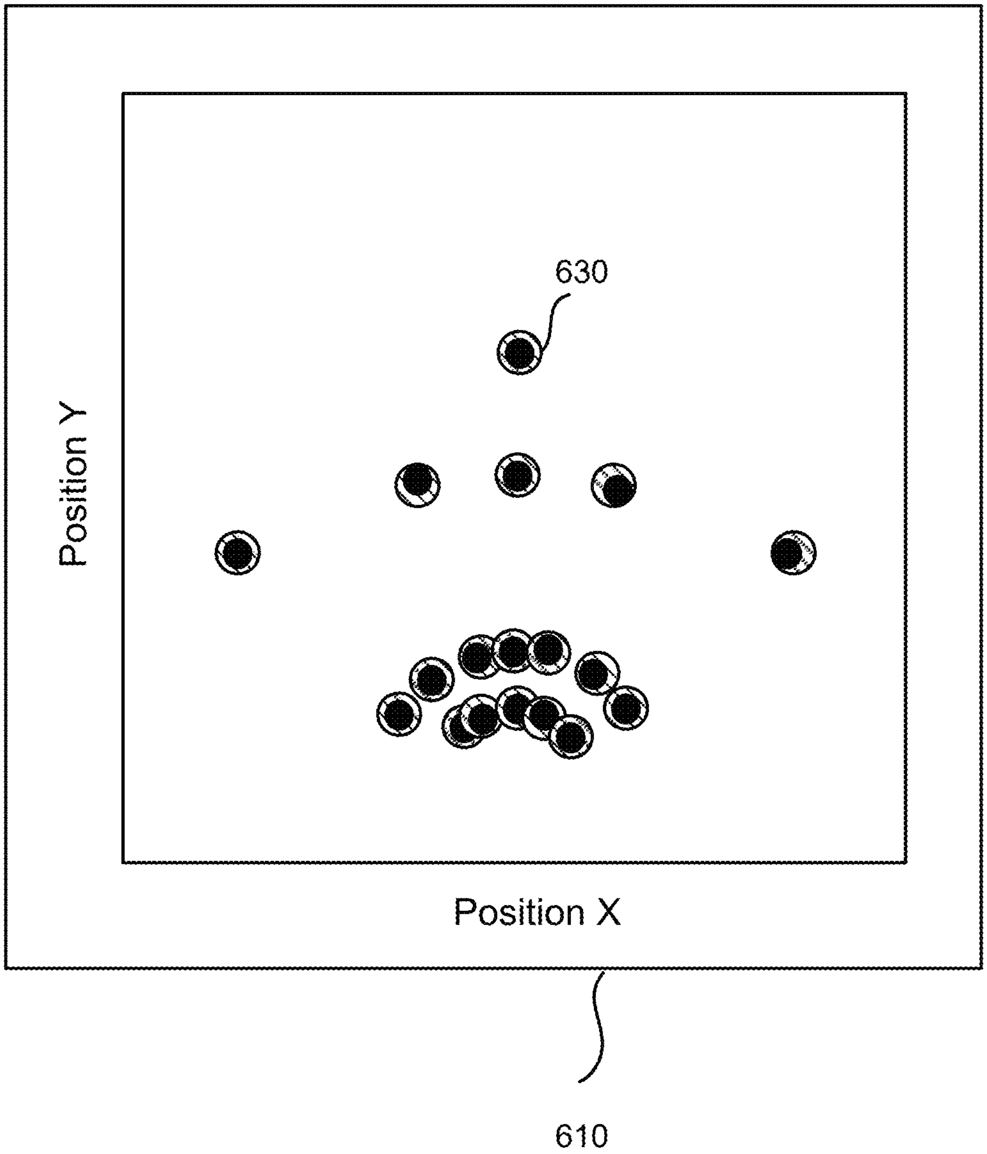
FIG. 6 shows an exemplary GUI of an application for verifying the accuracy of a perception system of a vehicle according to some embodiments.

FIG. 6 shows an exemplary graphics user interface (GUI) 610 of an application for verifying the accuracy of a perception system of a vehicle according to some embodiments. The GUI 610 displays the various locations of a target 630. The open circles represent the positions (e.g., X and Y coordinates) of the target as measured by a positioning solution (e.g., a GNSS system) attached to the target. The solid dots represent the positions of the target as measured by a perception sensor (e.g., a radar) mounted on the vehicle. It should be noted that, although only the X and Y coordinates are shown in this example, the position of the target can include three degrees of translational freedom (e.g., latitude, longitude, and altitude). In some embodiments, the orientation of the target can also be measured, which can include three degrees of rotational freedom (e.g., roll, pitch, and yaw).

The application can compare each pair of positions (each pair of solid dot and open circle) to determine whether they match with each other. For example, a distance between a position of the target as measured by the positioning solution and a corresponding position of the target as measured by the perception sensor can be determined. If the distance is greater than a predetermined threshold (either as an absolute value or a percentage value), the application may determine that the perception sensor is not correctly aligned.

In some embodiments, an operator may carry the target and a portable computer device to various locations around the vehicle. The computer device runs the application for verifying the accuracies of the perception sensors. The positioning solution of the target can measure the reference position of the target and send the reference position to the computer device via a wireless link. The perception system of the vehicle can measured the position of the target and send the measured position to the computer device via a wireless link. The application can then compare the measured position with the reference position.

Figure 7:
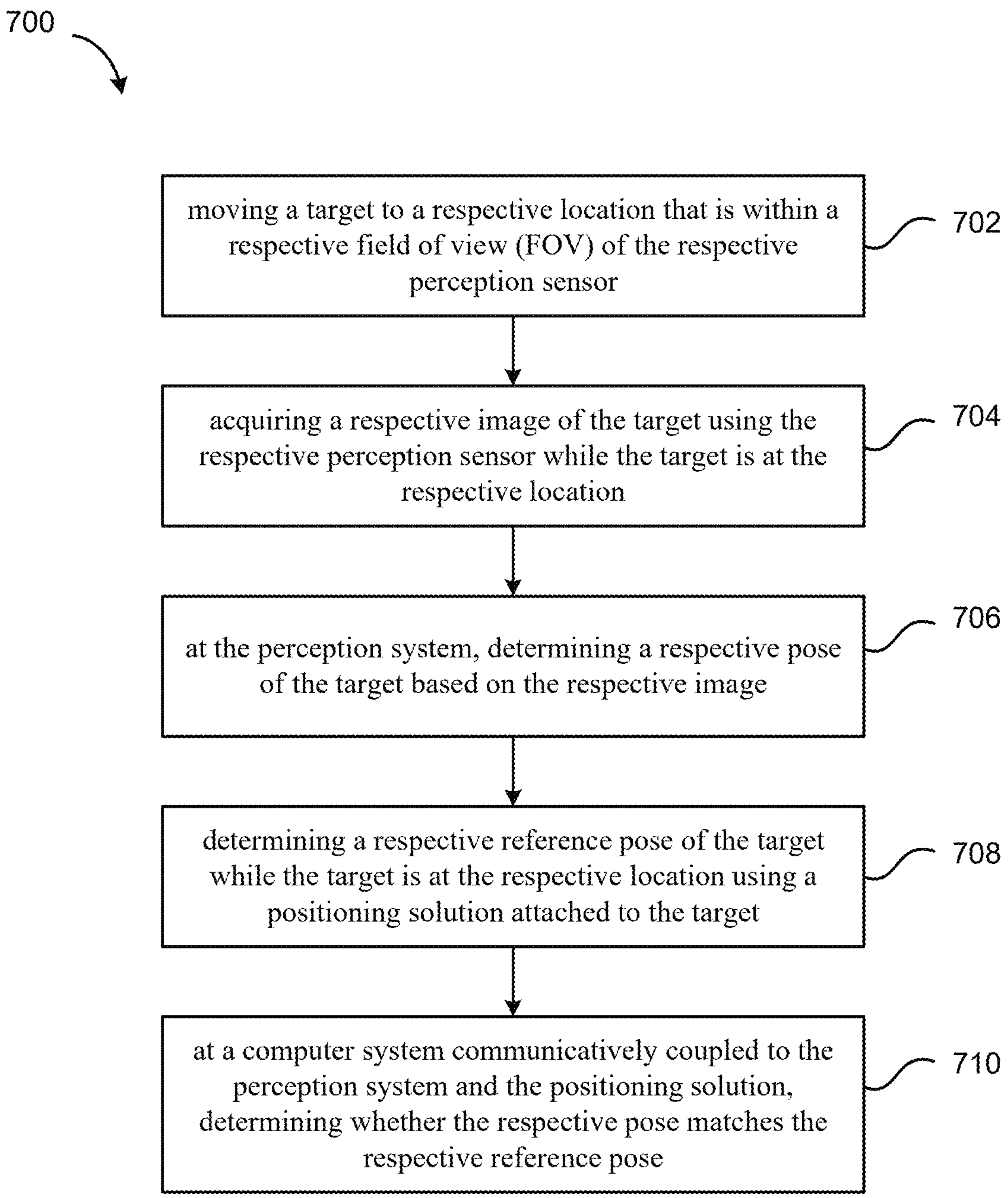
FIG. 7 shows a simplified flowchart illustrating a method of verifying accuracy of a perception system of a vehicle according to some embodiments.

FIG. 7 shows a simplified flowchart illustrating a method 700 of verifying accuracy of a perception system of a vehicle according to some embodiments. The perception system includes one or more perception sensors mounted on the vehicle.

The method 700 includes, at 702, for each respective perception sensor of the one or more perception sensors: moving a target to a respective location that is within a respective field of view (FOV) of the respective perception sensor; at 704, acquiring a respective image of the target using the respective perception sensor while the target is at the respective location; at 706, at the perception system, determining a respective pose of the target based on the respective image; at 708, determining a respective reference pose of the target while the target is at the respective location using a positioning solution attached to the target; and at 710, at a computer system communicatively coupled to the perception system and the positioning solution, determining whether the respective pose matches the respective reference pose.

According to some embodiments, the method 700 can further includes, at the computer system, upon determining that the respective pose matches the respective reference pose within a threshold, providing an indication to an operator that the respective perception sensor is correctly aligned.

According to some embodiments, the method 700 can further includes, at the computer system, upon determining that the respective pose deviates from the respective reference pose beyond a threshold, providing an indication to an operator that the respective perception sensor is not correctly aligned.

According to some embodiments, the method 700 can further includes, at the computer system, upon determining that, for each respective perception sensor of the one or more perception sensors, the respective pose matches the respective reference pose within a threshold, causing the perception system to be activated for navigation of the vehicle.

It should be appreciated that the specific steps illustrated in FIG. 7 provide a particular method of verifying accuracy of a perception system of a vehicle according to some embodiments. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Figure 8A:
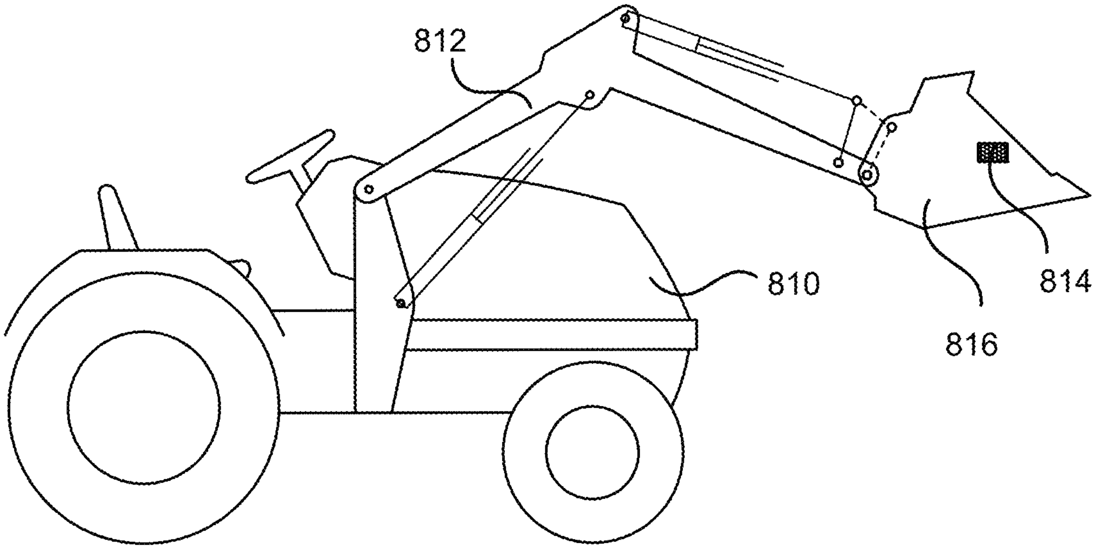
FIGS. 8A and 8B illustrate two examples in which perception sensors are mounted on articulated segments of a vehicle according to some embodiments.
Figure 8B:
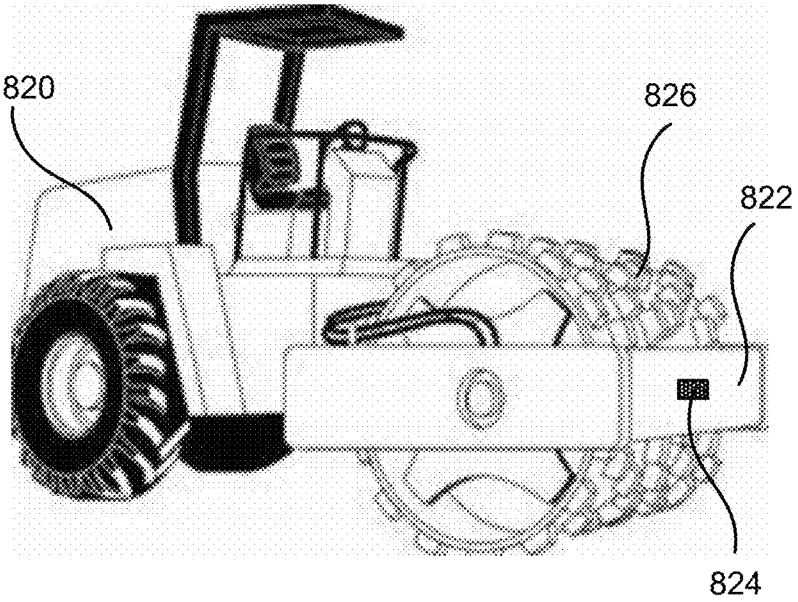

According to some embodiments, the methods of verifying accuracy of perception sensors described above can be applied to perception sensors that are mounted on articulated segments of a vehicle as well. FIGS. 8A and 8B illustrate two examples. FIG. 8A shows a vehicle 810 with a loader 816 attached thereto. The loader 816 can be raised or lowered via a hydraulic arm 812. A perception sensor 814 can be attached to the loader 816. Thus, the perception sensor 814 moves with the loader 816 as the loader 816 moves. The methods described above with reference to FIGS. 2A-2B, 4, 5, and 7 can also be applied to verify the accuracy of the perception sensor 814.

FIG. 8B shows a vehicle 820 with a soil compactor attached thereto. The soil compactor includes a roller 826 attached to a frame 822. A perception sensor 824 can be attached to the front of the frame 822. Other examples of vehicles with articulated segments can include a sprayer with boom arms, a harvester with a header, vehicles with a front or rear hitch, and the like. The methods described above with reference to FIGS. 2A-2B, 4, 5, and 7 can also be applied to these examples.

Figure 9A:
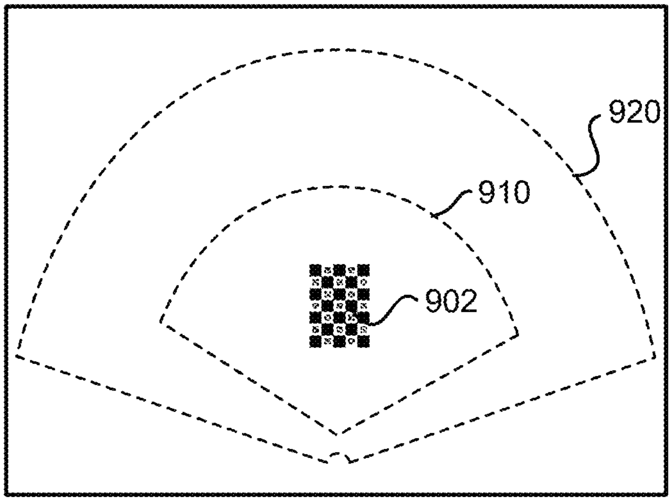
FIGS. 9A-9C illustrate some examples in which accuracies of perception sensors can be verified by correlating the sensor data of different perception sensors according to some embodiments.
Figure 9B:
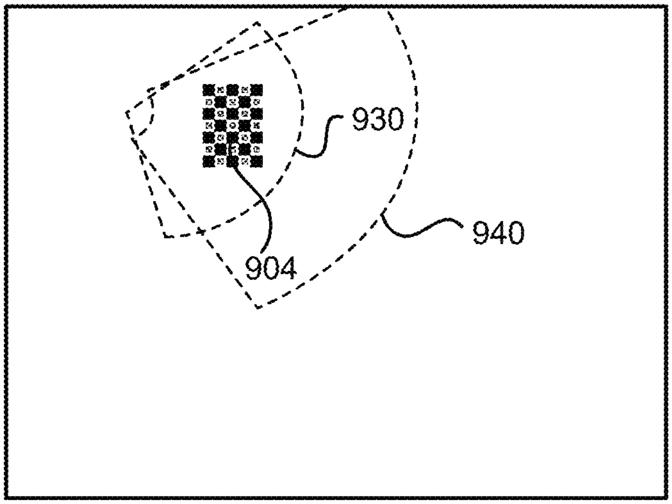
Figure 9C:
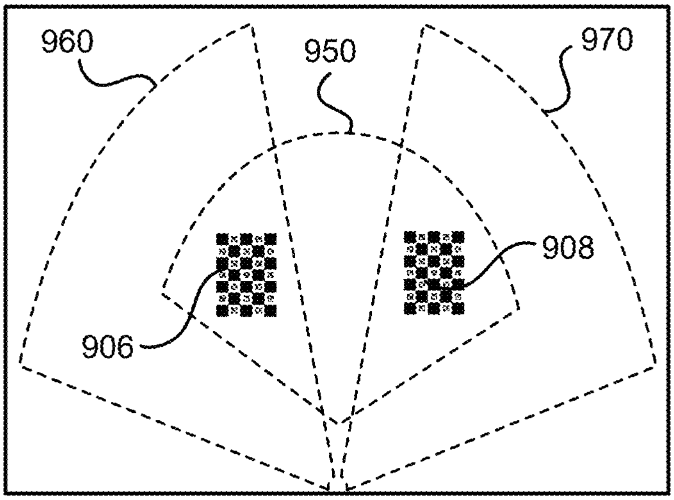

According to some embodiments, the accuracies of perception sensors can be verified by correlating the sensor data of different perception sensors. FIGS. 9A-9C illustrate some examples. FIG. 9A shows an example in which a first FOV 910 of a first perception sensor is encompassed by a second FOV 920 of a second perception sensor. Thus, if a target 902 is positioned within the first FOV 910, both the first perception sensor and the second perception sensor would be able to detect it. A comparison of a first pose of the target 902 measured by the first perception sensor and a second pose of the target 902 measured by the second perception sensor can serve as a cross-check of whether the first perception sensor and/or the second perception sensor are correctly aligned. If the first pose and the second pose do not match with each other, it is likely that one or both of the first perception sensor and the second perception sensor are not correctly aligned.

FIG. 9B shows an example in which a first FOV 930 of a first perception sensor is partially encompassed by a second FOV 940 of a second perception sensor. In this example, if a target 904 is positioned within a region where the first FOV 930 and the second FOV 940 overlap, both the first perception sensor and the second perception sensor would be able to detect it. Thus, the accuracies of the first perception sensor and the second perception sensor can be cross-checked by comparing the sensor data of the two perception sensors.

FIG. 9C shows a first FOV 950 of a first perception sensor, a second FOV 960 of a second perception sensor, and a third FOV 970 of a third perception sensor. As illustrated, the first FOV 950 partially overlaps with the second FOV 960, and also partially overlaps with the third FOV 970. Thus, the accuracies of the first perception sensor and the second perception sensor can be cross-checked by placing a first target 906 in a region where the first FOV 950 and the second FOV 960 overlap. Similarly, the accuracies of the first perception sensor and the third perception sensor can be cross-checked by placing a second target 908 in a region where the first FOV 950 and the third FOV 970 overlap.

According to some embodiments, the accuracy of a perception system of a vehicle can be verified by using targets installed on the vehicle. For example, the targets can be installed in the manufacturing plant, or can be installed when the perception system is installed. Each target is within the field of view of at least one perception sensor of the perception system. A reference pose of each target can be measured when the target is installed. For example, the reference pose can be measured using high precision laser measurement devices, GNSS sensors, or using calibrated perception sensors.

Figure 10A:
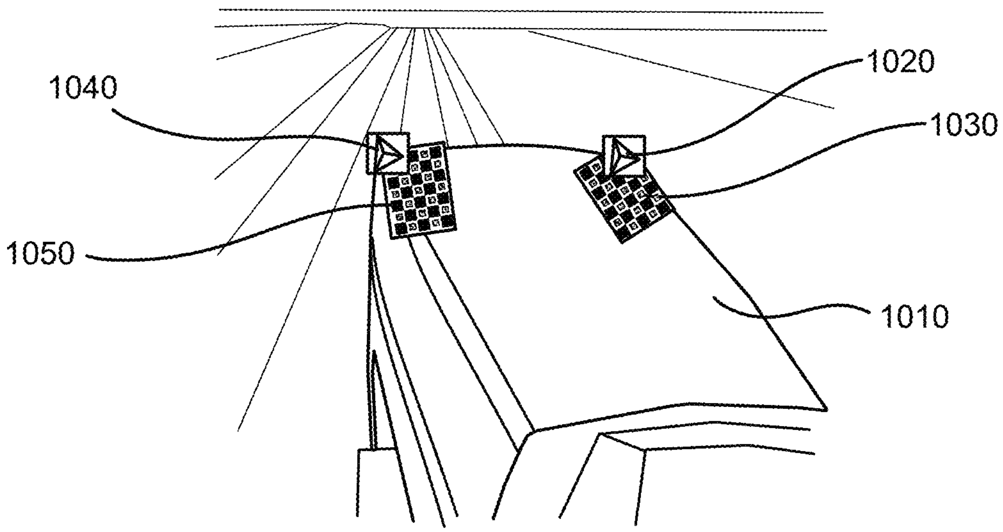
FIG. 10A illustrates an example of using targets installed on a vehicle to verify the accuracy of a perception system of the vehicle according to some embodiments.

FIG. 10A illustrates an example of using targets installed on a vehicle to verify the accuracy of a perception system of the vehicle according to some embodiments. As illustrated, four targets 1020, 1030, 1040, and 1050 are installed at the two front corners of the engine hood 1010. The targets 1020, 1030, 1040, and 1050 can be within the FOV of a perception sensor (not shown) mounted on the vehicle (e.g., mounted at the front windshield or the top of a cab). The perception sensor can measure a pose of each of the targets 1020, 1030, 1040, and 1050, and compare the measured pose with a reference pose. If the measure pose matches the reference pose, it can be determined that the perception sensor is aligned correctly.

Figure 10B:
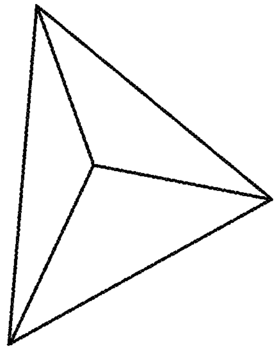
FIG. 10B-10E show some exemplary types of targets that can be used for verify the accuracy of a perception system of the vehicle according to some embodiments.
Figure 10C:
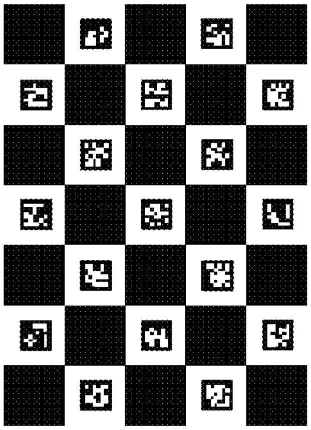
Figure 10D:
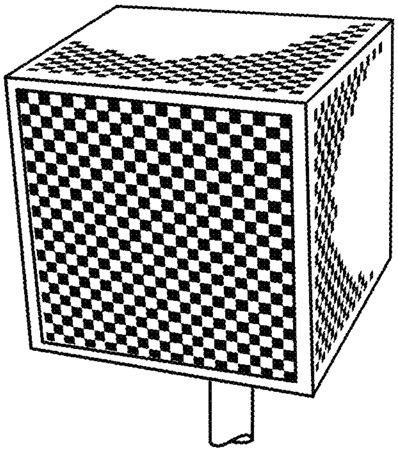
Figure 10E:
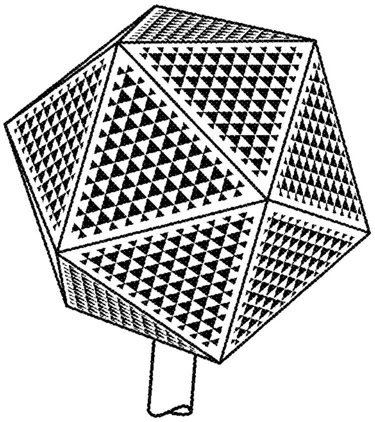

FIG. 10B-10E show some exemplary types of targets that can be used. FIG. 10B shows a corner reflector that can be used as a target. The corner reflector can return a strong signal to radar sensors, allowing for accurate detection. FIG. 10C shows a ChArUco board that can be used as a target. The ChArUco board combines a chessboard with ArUco markers. The ArUco markers allow fast and versatile detection, while the chessboard allows accurate position measurements. FIG. 10D shows a cube with checkerboards that can be used as a target. FIG. 10E shows an icosahedron with deltille grids that can be used as a target. Other types of targets that allow accurate position measurements can also be used. One of ordinary skill in the art would recognize many variations, alternatives, and modifications.

Figure 11:
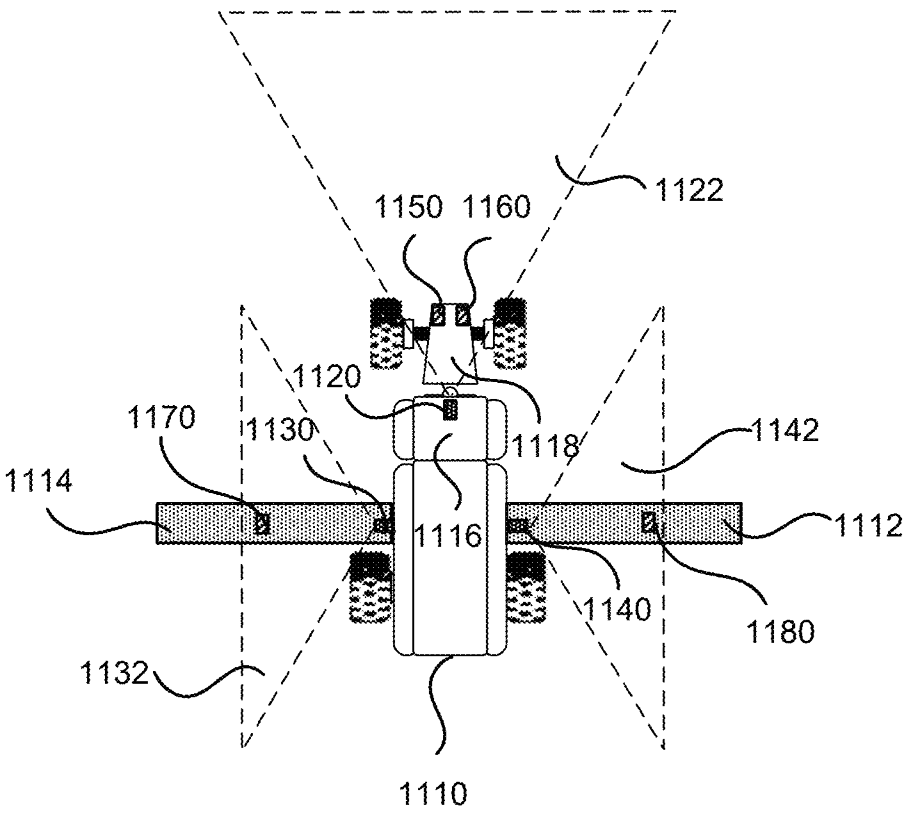
FIG. 11 illustrates an example of using targets installed on a vehicle to verify the accuracy of a perception system of the vehicle according to some embodiments.

FIG. 11 illustrates another example of using targets installed on a vehicle to verify the accuracy of a perception system of the vehicle according to some embodiments. The vehicle 1110 is a sprayer that includes two booms 1112 and 1114 attached to either side of the vehicle 1110. A first perception sensor 1120 is positioned at the front of the cab 1116 of the vehicle 1110 and has a FOV 1122 directed toward the front. A second perception sensor 1130 is positioned at the left side of the vehicle 1110 and has a FOV 1132 directed toward the left. A third perception sensor 1140 is positioned at the right side of the vehicle 1110 and has a FOV 1142 directed toward the right. A first target 1150 and a second target 1160 can be installed at the two front corners of the engine hood 1118, so that they are in the FOV 1122 of the first perception sensor 1120. A third target 1170 can be installed on the left boom 1114, so that it is in the FOV 1132 of the second perception sensor 1130. A fourth target 1180 can be installed on the right boom 1112, so that it is in the FOV 1142 of the third perception sensor 1140. The first perception sensor 1120 can measure a pose of each the first target 1150 and the second target 1160, and compare the measured pose with a first reference pose and a second reference pose, respectively. The second perception sensor 1130 can measure a pose of the third target 1170, and compare the measured pose with a third reference pose. The third perception sensor 1140 can measure a pose of the fourth target 1180, and compare the measured pose with a fourth reference pose.

According to some embodiments, prior to operating a vehicle, sensor data from various perception sensors can be queried to verify that each perception sensor correctly detects a respective target installed on the vehicle. If one or more perception sensors are not correctly aligned, the perception system of the vehicle may not be activated for the navigation of the vehicle, and an operator can be alerted to the problem. In some embodiments, sensor data from various perception sensors can be continuously queried during the operation of the vehicle, to verify that each perception sensor correctly detects a respective target installed on the vehicle. Thus, a sensor misalignment (e.g., caused by hitting a tree branch) can be detected as soon as it happens.

Figure 12:
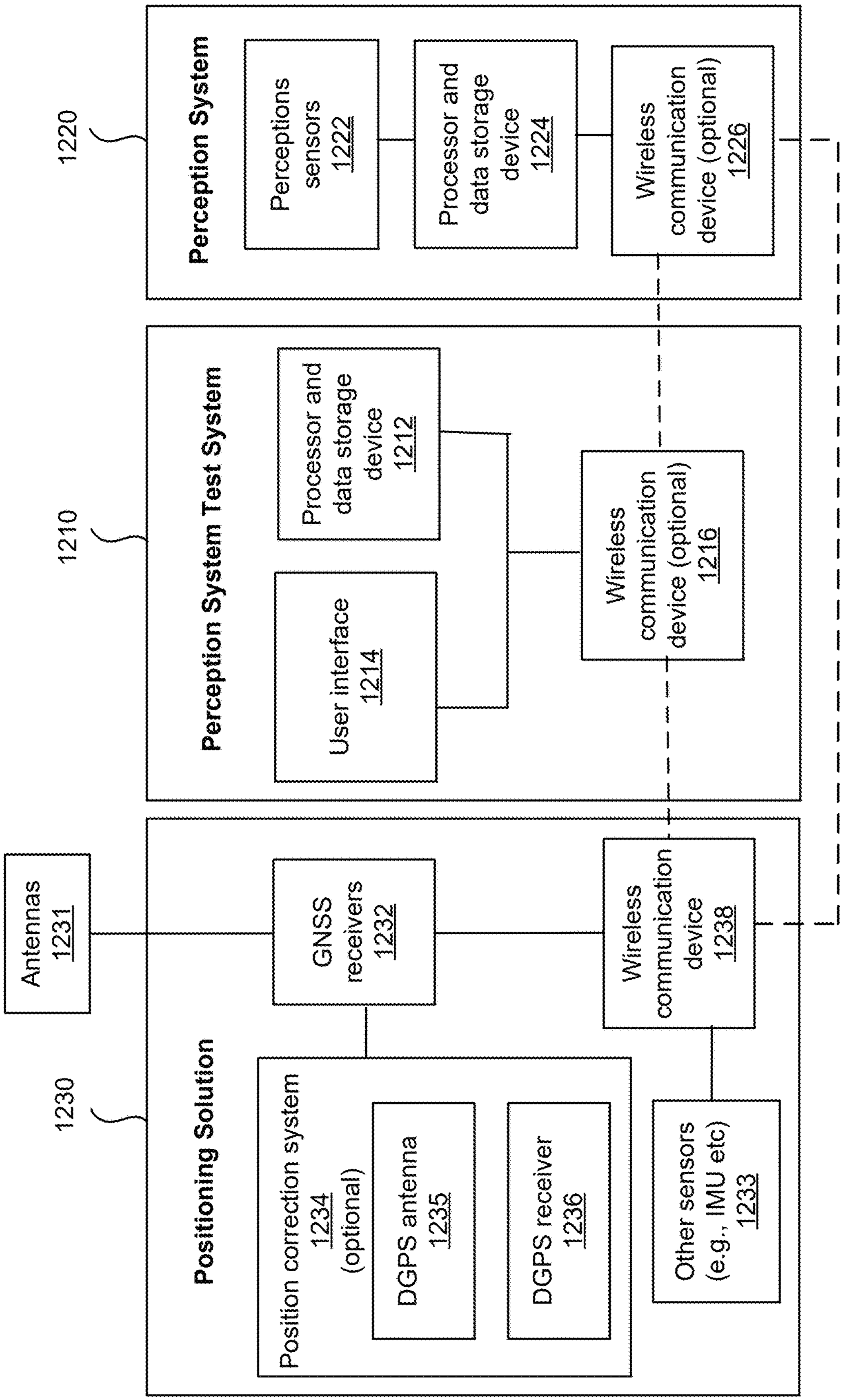
FIG. 12 shows an exemplary block diagram of a perception system test system according to some embodiments.

FIG. 12 shows an exemplary block diagram of a perception system test system 1210 that can perform the methods of verifying accuracy of a perception system of a vehicle described herein according to some embodiments. The perception system test system 1210 can include a computer processor and a data storage device 1212. The perception system test system 1210 can also include a user interface 1214, and optionally a wireless communication device 1216. The perception system test system 1210 can be communicatively coupled to the perception system 1210 of the vehicle. The perception system 1220 of the vehicle can include one or more perception sensors 1222 mounted on the vehicle, and a computer processor and a data storage device 1224. The perception system 1220 can include an optional wireless communication device 1226. In some embodiments, the perception system test system 1210 can be communicatively coupled to the perception system 1220 via the wireless communication devices 1216 and 1226. In some embodiments, instead of being a separate system, the perception system test system 1210 can be part of the perception system 1220.

The perception system test system 1210 can also be communicatively coupled to a positioning solution 1230 attached to a target. In some embodiments, the positioning solution 1230 can include one or more antennas 1231 and one or more GNSS receivers 1232 coupled to the one or more antennas 1231. The one or more GNSS receivers 1232 may be configured to determine a position of the target based on the satellite signals received from GNSS satellites. The one or more GNSS receivers 1232 may also be configured to determine an orientation of the target (e.g., using two GNSS receivers spaced apart from each other). In some embodiments, the positioning solution 1230 can include a position correction system 1234. The position correction system 1234 can include an antenna 1235 and a receiver 1236 for receiving correction data from a reference station or a network of reference stations. For example, the position correction system 1234 may include a differential global positioning system (DGPS). The correction data may be used by the GNSS receivers 1236 to determine a more precise position of the target (e.g., to millimeter or sub-millimeter accuracies). In some embodiments, the positioning solution 1230 can include additional sensors 1233, such as inertial measurement units (IMUs) and the like. The positioning solution 1230 can include a wireless communication device 1238. In some embodiments, the perception system test system 1210 can be communicatively coupled to the positioning solution 1230 via the wireless communication devices 1216 and 1238. According to some embodiments, the perception system 1220 can also be communicatively coupled to a positioning solution (similar to the positioning solution 1230) that is attached to the vehicle and configured to determine the position of the vehicle. The perception system 1220 can be configured to estimate the location of the target with respect to the vehicle coordinate system based on the data of the perception sensors and the GNSS data, as well as other sensor data (e.g., IMU data and the like).

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of verifying accuracy of a perception system of a vehicle, the perception system including one or more perception sensors mounted on the vehicle, the method comprising, for each respective perception sensor of the one or more perception sensors:
- moving a target to a respective location that is within a respective field of view (FOV) of the respective perception sensor;
- acquiring a respective image of the target using the respective perception sensor while the target is at the respective location;
- at the perception system, determining a respective pose of the target based on the respective image;
- determining a respective reference pose of the target while the target is at the respective location using a positioning solution attached to the target; and
- at a computer system communicatively coupled to the perception system and the positioning solution, determining whether the respective pose matches the respective reference pose.

2. The method of claim 1 further comprising:
- at the computer system, upon determining that the respective pose matches the respective reference pose within a threshold, providing an indication to an operator that the respective perception sensor is correctly aligned.

3. The method of claim 1 further comprising:
- at the computer system, upon determining that the respective pose deviates from the respective reference pose beyond a threshold, providing an indication to an operator that the respective perception sensor is not correctly aligned.

4. The method of claim 1 further comprising:
- at the computer system, upon determining that, for each respective perception sensor of the one or more perception sensors, the respective pose matches the respective reference pose within a threshold, causing the perception system to be activated for navigation of the vehicle.

5. The method of claim 1 wherein the positioning solution comprises one or more global navigation satellite systems (GNSS) devices attached to the target.

6. The method of claim 1 wherein the one or more perception sensors comprise one or more radar sensors, one or more LiDAR sensors, one or more cameras, or a combination thereof.

7. The method of claim 1 wherein at least one of the one or more perception sensors is mounted on an articulated segment of the vehicle.

8. The method of claim 1 wherein the one or more perception sensors comprise at least a first perception sensor with a first FOV and a second perception sensor with a second FOV, and the second FOV at least partially overlaps with the first FOV, the method further comprising:
- moving the target to a first location that is within both the first FOV and the second FOV;
- acquiring a first image of the target using the first perception sensor;
- acquiring a second image of the target using the second perception sensor;
- at the perception system:
  - determining a first pose of the target based on the first image; and
  - determining a second pose of the target based on the second image; and
- at the computer system, determining whether the first pose matches the second pose.

9. The method of claim 1 wherein the one or more perception sensors includes a first perception sensor with a first FOV, the vehicle includes a first target mounted at a first location on the vehicle, the first location being within the first FOV of the first perception sensor, and the first target has a known pose at the first location, the method further comprising:
- acquiring a first image of the first target using the first perception sensor;
- at the perception system, determining a first pose of the first target based on the first image; and
- at the computer system, determining whether the first pose matches the known pose.

10. The method of claim 1 wherein the respective pose comprises a respective position and a respective orientation of the target, and the respective reference pose comprises a respective reference position and a respective reference orientation of the target.

11. A non-transitory computer-readable medium comprising instructions that, when executed by one or more processors, cause the one or more processors to perform operations for verifying accuracy of a perception system of a vehicle, the perception system including one or more perception sensors mounted on the vehicle, the operations comprising, for each respective perception sensor of the one or more perception sensors:
- moving a target to a respective location that is within a respective field of view (FOV) of the respective perception sensor;
- acquiring a respective image of the target using the respective perception sensor while the target is at the respective location;
- at the perception system, determining a respective pose of the target based on the respective image;
- determining a respective reference pose of the target while the target is at the respective location using a positioning solution attached to the target; and
- at a computer system communicatively coupled to the perception system and the positioning solution, determining whether the respective pose matches the respective reference pose.

12. The non-transitory computer-readable medium of claim 11 further comprising:

at the computer system, upon determining that the respective pose matches the respective reference pose within a threshold, providing an indication to an operator that the respective perception sensor is correctly aligned.

13. The non-transitory computer-readable medium of claim 11 further comprising:

at the computer system, upon determining that the respective pose deviates from the respective reference pose beyond a threshold, providing an indication to an operator that the respective perception sensor is not correctly aligned.

14. The non-transitory computer-readable medium of claim 11 further comprising:

at the computer system, upon determining that, for each respective perception sensor of the one or more perception sensors, the respective pose matches the respective reference pose within a threshold, causing the perception system to be activated for navigation of the vehicle.

15. The non-transitory computer-readable medium of claim 11 wherein the positioning solution comprises one or more global navigation satellite systems (GNSS) devices attached to the target.

16. The non-transitory computer-readable medium of claim 11 wherein the one or more perception sensors comprise one or more radar sensors, one or more LiDAR sensors, one or more cameras, or a combination thereof.

17. The non-transitory computer-readable medium of claim 11 wherein at least one of the one or more perception sensors is mounted on an articulated segment of the vehicle.

18. The non-transitory computer-readable medium of claim 11 wherein the one or more perception sensors comprise at least a first perception sensor with a first FOV and a second perception sensor with a second FOV, and the second FOV at least partially overlaps with the first FOV, the operations further comprising:

moving the target to a first location that is within both the first FOV and the second FOV;

acquiring a first image of the target using the first perception sensor;

acquiring a second image of the target using the second perception sensor;

at the perception system:

determining a first pose of the target based on the first image; and determining a second pose of the target based on the second image; and at the computer system, determining whether the first pose matches the second pose.

19. The non-transitory computer-readable medium of claim 11 wherein the one or more perception sensors includes a first perception sensor with a first FOV, the vehicle includes a first target mounted at a first location on the vehicle, the first location being within the first FOV of the first perception sensor, and the first target has a known pose at the first location, the operations further comprising:

acquiring a first image of the first target using the first perception sensor;

at the perception system, determining a first pose of the first target based on the first image; and at the computer system, determining whether the first pose matches the known pose.

* * * * *